United States Patent [19]

Hoffmann et al.

[11] Patent Number: 4,966,019

[45] Date of Patent: Oct. 30, 1990

[54] ANTI-THEFT ARRANGEMENT FOR A VEHICLE

[76] Inventors: David Hoffmann; Ralph L. Harris, both of 39 Sherborne Ave., Luton, Bedfordshire LU2 7BD, United Kingdom

[21] Appl. No.: 388,255

[22] Filed: Aug. 1, 1989

[30] Foreign Application Priority Data

Dec. 7, 1987 [GB] United Kingdom ............... 8728531

[51] Int. Cl.$^5$ .............................................. E05B 65/12
[52] U.S. Cl. ....................................... 70/257; 70/255; 70/239; 70/243
[58] Field of Search ............ 70/243, 242, 237, 238, 70/239, 256, 257, 417, 255; 180/114

[56] References Cited

U.S. PATENT DOCUMENTS 2,913,894 11/1959 Gieray ................................... 70/243
3,756,341 9/1973 Tonkowich .......................... 180/114
3,797,287 3/1974 Iba ......................................... 70/239

Primary Examiner—Robert L. Wolfe
Attorney, Agent, or Firm—Collard, Roe & Galgano

[57] ABSTRACT

An anti-theft arrangement for a motor vehicle comprising an electrically operable device associated with a system or component essential to operation of the engine of the vehicle and which in a first state permits normal operation of the associated system or component and which in a second state does not, and wherein the supply of electrical current to said device is controlled by combination or key-operated switching means and in which the arrangement is such that said electrically operable device is automatically placed in its state preventing normal operation of the engine upon disconnection of the device from a supply of electrical current.

8 Claims, 3 Drawing Sheets

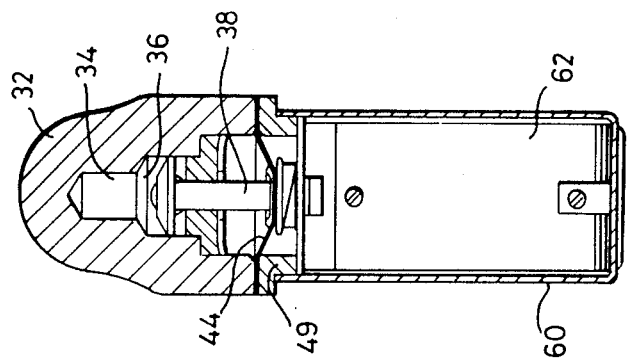
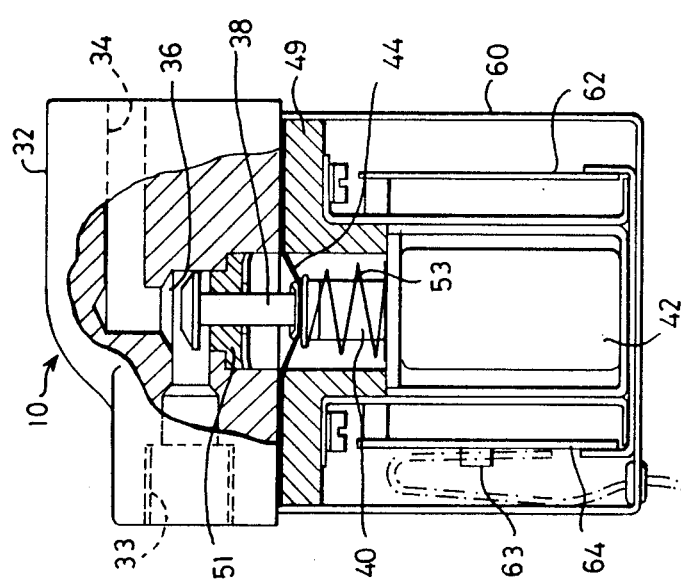

ANTI-THEFT ARRANGEMENT FOR A VEHICLE

THIS INVENTION relates to an anti-theft arrangement for a vehicle.

BACKGROUND OF THE INVENTION

Various vehicle anti-theft devices are known which immobilise a vehicle and prevent the vehicle from being driven away by a thief even if the latter has gained entry to the interior of the vehicle. However there is a demand for a vehicle anti-theft arrangement in which the operative connection between a control unit disposed in the driver's cabin and a vehicle disabling device is effected entirely electrically and it is an object of the present invention to provide an improved anti-theft device of this character.

SUMMARY OF THE INVENTION

According to one aspect of the invention there is provided an anti-theft arrangement for a motor vehicle comprising an electrically operable device associated with a system or component essential to operation of the engine of the vehicle and which in a first state permits normal operation of the associated system or component and which in a second state does not, and wherein the supply of electrical current to said device is controlled by combination or key-operated switching means and in which the arrangement is such that said electrically operable device is automatically placed in its state preventing normal operation of the engine upon disconnection of the device from a supply of electrical current.

An embodiment of the invention is described below by way of example with reference to the accompanying drawings.

BRIEF DESCRIPTION OF THE DRAWINGS

In the drawings:

FIG. 4 is a view, partly in section and partly in side elevation of an electrically operable valve forming another part of the vehicle anti-theft arrangement, and FIG. 5 is a view in section along the line A—A of FIG. 4.

DESCRIPTION OF THE PREFERRED EMBODIMENT

Figure 1:
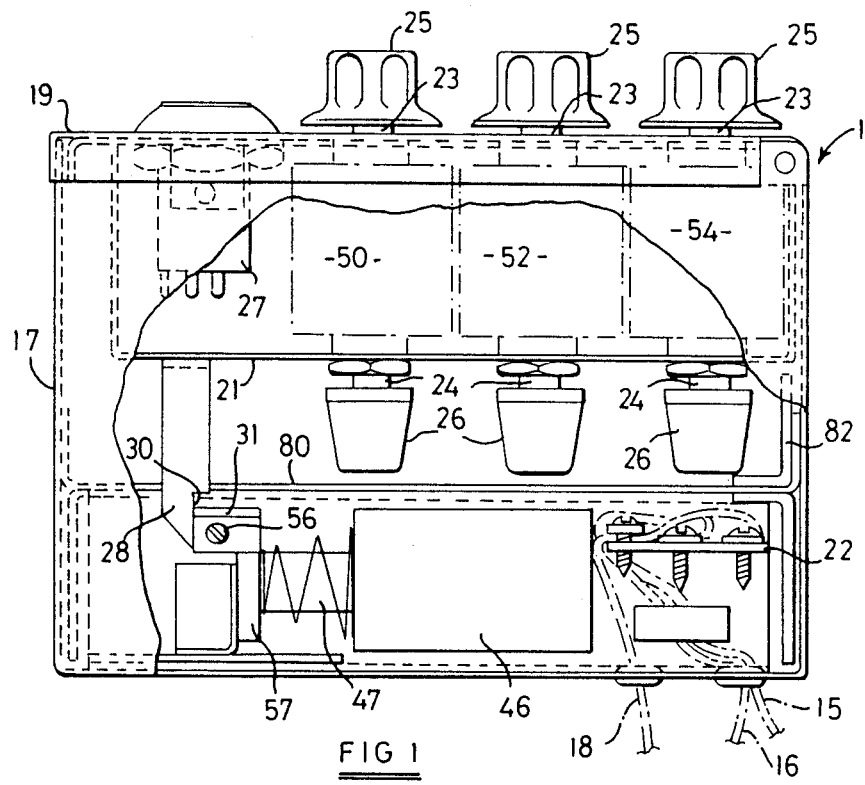
FIG. 1 is a side elevation view, partly broken away, of a control unit forming part of an anti-theft arrangement embodying the invention.

An anti-theft arrangement for a vehicle includes a disabling device, such as a fuel cut-off valve 10, (FIGS. 4 and 5), which is connected in the fuel supply line of the vehicle between the fuel tank and the engine and which is controlled by a control unit 14 (FIGS. 1 to 3) mounted within the cabin of the vehicle. The control unit 14 comprises a metal casing to which insulated positive and negative electrical supply conductors 15 and 16 extend and from which a multi-conductor flat ribbon cable 18 extends to the cut-off valve. The conductors 15 and 16 and the conductors of cable 18 are connected within the casing to a distribution board 22. The control unit 14 incorporates combination switches 50, 52 and 54. The cut-off valve can only be placed and held in an open condition, allowing the supply of fuel to the engine, by setting the combination switches to a particular combination of positions. When the combination switches are so set, and provided that an appropriate supply voltage is present across conductors 15 and 16, the control unit 14 energises appropriate conductors of the flat ribbon cable 18 to open the valve, as explained below.

The unit 14 comprises a hollow body part 17 closed by a lid 19 which carries the combination switches. The combination switches are multi-position rotary switches, each having a first operating spindle 23 projecting from the casing through a respective aperture in the lid 19 and a second co-axial, operating spindle 24 projecting inwardly into the casing away from the lid 19. Both the inner and the outer operating spindles of each switch (50, 52, 54) carry a respective knob 25, 26 respectively. Each switch is arranged to provide an electrically conductive path therethrough only when the outer operating knob, and thus the outer spindle, is rotated to a particular position (determined by the rotational position of the inner spindle), the various positions of the switches being indicated by respective numbered scales (not shown), and marker indices on the outer knobs and the outer surface of the lid 19, so that the appropriate combination of switch positions can be memorised as a number sequence. The terminals of the switches 50, 52, 54 are connected in series with one another so that when all three switches 50, 52, 54 are in their respective appropriate positions, a respective circuit is established from the supply conductors 15, 16, through the switches 50, 52, 54 in series. Preferably, each switch 50, 52, 54 is a multi-way switch, so that, in the appropriate combination of switch positions, a plurality of separate circuits is established, each extending through all three switches, one such circuit, for example providing energisation of a solenoid 46 via a key operated switch 27 and another, or others, connecting the appropriate conductors of the cable 18 with the appropriate conductors 15, 16. The appropriate combination is set, after opening of the lid 19, by turning the inner knobs 26 to desired positions (the inner knobs 26 and the adjacent inner shell 21 of the lid, bearing cooperating numerical scales and indices corresponding to those on the knobs 25 and the outer surface of the lid).

The key operated switch 27 is also mounted on the lid 19 and is connected in series with the switches 50, 52, 54 and with the solenoid 46. The solenoid serves only as part of a system designed to prevent the function of the device being circumvented by unauthorised opening of the casing of unit 14. The lid 19 carries on its underside the internal shell 21, which encloses the bodies of switches 50, 52, 54, and from which the inner operating spindles 24 project. A latch bar 28 extends downwardly from the shell 21 and has a notch 30 adjacent its lower end in which, normally, there is engaged a locking detent 31 carried at the end of the armature 47 of the solenoid, whereby opening of the lid is prevented when the solenoid is de-energised. The lid 19 is hingedly connected with the body 17 at one end and the latch bar 28 is provided adjacent the other end of the lid. In order to allow the combination associated with the combination switches to be altered when desired, the combination switches are set to the appropriate combination, and the key operated switch 27 is operated energising the solenoid 46 to withdraw the locking detent 31 from the latch bar 28 so that the lid 19 can be hinged upwardly to allow access to the inner knobs 26 to set or alter the combination.

With a view to preventing the device being circumvented by unauthorised persons prising open the lid, a fine frangible conductive wire 48, forming part of the respective circuitry, is extended tautly between two set screws 56 carried by a yoke 57 afforded by the structure, mounted on the armature 47 of the solenoid, which structure 57 also affords the detent 31, the wire 48 being positioned so as to be closely adjacent to the edge of the latch bar 28. Thus it is highly probable that if a thief should succeed in prising open the lid 19, the lid will be so distorted in so doing that the bar 28 will be caused to break the wire 48 ensuring that even if the switches 50, 52, 54 are thereafter set to their appropriate positions, the cut off valve will not be appropriately energised to cause it to open.

Figure 2:
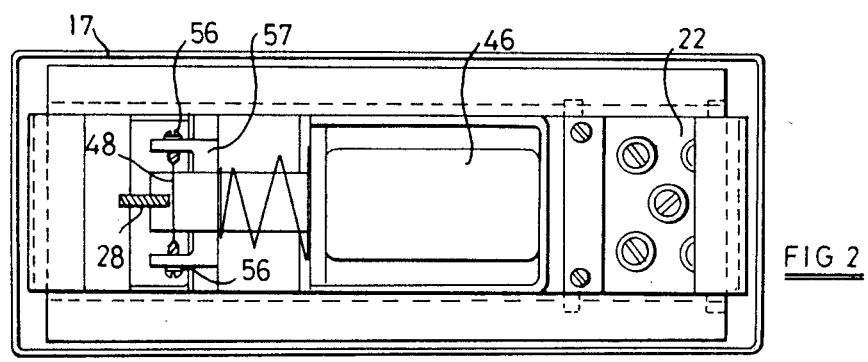
FIG. 2 is a view in section along the line Z—Z of FIG. 1 of the control unit.
Figure 3:
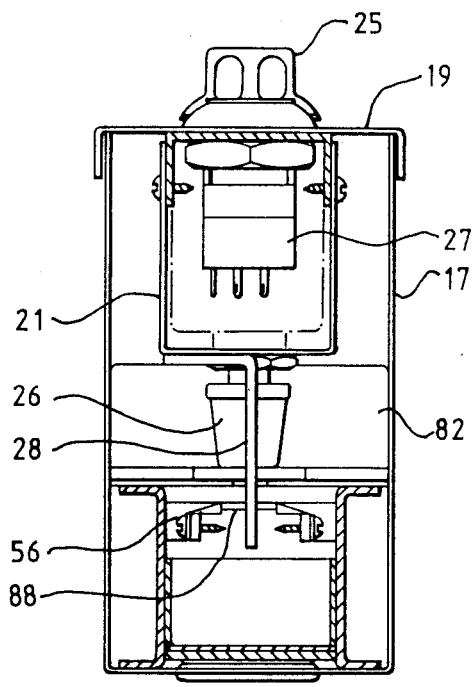
FIG. 3 is a view in vertical section along the line X—X of FIG. 1.

In FIGS. 4 and 5, there is illustrated a cut-off valve 10 intended to be interposed in the fuel supply line of the engine of the vehicle, which may be a diesel engine or a spark-ignition petrol engine, and which cut-off valve is adapted to be exclusively controlled by the device of FIGS. 1 to 3. The valve comprises a body 32 which is formed with a fuel inlet passage 33, a fuel outlet passage 34 and a valve seat 36 at the junction of the fuel inlet and outlet passages. The valve includes a valve member 38 which cooperates with the valve seat 36. Although the valve seat 36 and the head of the valve member 38 are shown as being of complementary frustoconical shape, it will be appreciated that other forms may be adopted. For example, the valve seat may simply terminate in a relatively sharp annular edge for engagement with a resilient surface provided on the head of the valve member 38. The valve member 38 is screwed onto the end of a coaxial armature 40 of a solenoid 42 with the interposition of a resilient sealing membrane 44 which at its periphery is clamped sealingly between the underside of the body 32 and the upper surface of a mounting block 49, to which the coil and supporting frame of the solenoid 42 are secured.

The valve member 38 has a cylindrical stem extending upwardly, from the armature 40 to pass sealingly through a sealed valve guide 51 which separates the valve chamber from the region of the solenoid on the underside of the block 49. The seal 51 in principle prevents the leakage of fuel from the passages in the body 32 into the solenoid housing, but it will be appreciated that the membrane 44 acts as a back-up seal in case the seal 51 should become faulty. In a variant, oil seals may be used instead of the membrane 44. The solenoid armature 40 is biased by a compression spring 53 towards the position in which the head of the valve member 38 is held against the valve seat 36, so that the valve is in its closed or cut-off position when the solenoid is not energised. Consequently, an attempt to circumvent the valve by cutting all of the conductors leading thereto merely ensures that the valve remains in its closed position, immobilising the vehicle. It is preferred that the valve body 32 be mounted between the lift pump and the injection pump in the diesel engine fuel system and be positioned so that the length of the fuel line extending from outlet 34 to the injection pump of the diesel engine is as short as possible. Accordingly, should a thief even attempt to start the engine with the valve closed, the amount of fuel downstream of the valve member 38 will not be enough to allow the engine to start. If the cut-off valve were connected upstream of the lift pump, this might allow an unauthorised person to start the engine and drive the vehicle for some distance before the engine ran out of fuel. The fuel lines connecting with the valve 10 are preferably armoured, at least that extending from outlet 34. Diesel-engine vehicles nowadays are commonly provided with an "electric stop" facility whereby operation of an electrical switch, for example a key switch or a push-button switch closes a solenoid-operated valve in a fuel line to stop the engine, in such a vehicle, the last-mentioned solenoid-operated valve may be used in place of, or in addition to, the cut-off valve 10 referred to above, such solenoid valve being so connected with the control circuitry in the control unit 14 that the solenoid valve will be closed if either the respective cut-off switch has been operated, or the control unit 14 has not been set appropriately, (or both).

A hollow casing 60 fitted over the block 49 encloses not only the body and supporting frame of the solenoid 42, but also electrical and electronic circuitry mounted on printed circuit boards 62, 64, carried by the block 49 and connected with the flat ribbon cable 18 which passes into the casing 60 through an appropriate narrow slot, and is secured to the board 64 within the casing 60 by means of a cable clip 63.

The flat conductor ribbon preferably comprises 16 colour coded conductors, the majority of which are "dummies" which play no part in the operation of the device, or which normally carry coding signals cooperating with circuitry, (not shown) in unit 14 and casing 60, arranged to ensure that the vehicle is immobilised if the conductors of the ribbon cable are severed. This feature makes it even more difficult for an unauthorised person to activate the cut off valve by interfering with the flat ribbon cable between the control box and the valve unit.

It will be appreciated that further modifications are possible. For example, it may be arranged that, in order for the valve to be opened, the control box must supply to the valve unit an appropriately coded (e.g. pulsed) signal which is decoded by circuitry within the valve unit. Alternatively, a "gating signal" may be supplied from the control unit to the valve unit in the form of a light signal transmitted by way of a fibre-optic cable extended between the units.

It will be appreciated that in order to make the device as difficult as possible to circumvent, the casing 17, lid 19 and casing 60 may either be made of suitably hardened steel or portions strategically located within these components may be hardened or otherwise reinforced. It will be noted from FIGS. 1 and 2 that the lid 19 has an outer flange which overlaps the wall of the casing 17 around the outside of the latter and a further flange which extends along and down the inner surface of the front wall of the casing 17. This increases the difficulty which would be experienced by a thief attempting to pry open the lid 19. It will also be noted that the casing 17 has an internal wall 80 which separates the part containing the solenoid 46, the yoke and detent 57, 31 and the connected ends of the cable 18 and conductors 15, 16 from the remainder, (the bar 28 extending through an aperture in this wall). Thus if a thief were to drill out rivets provided for securing the solenoid assembly to the bottom of the casing 17, the lid 19 could not be opened by lifting the whole assembly still latched to the latch bar 28. The wall 80 is secured in place by spot-welding, after which additional hardened brackets 82 are welded in place for reinforcement.

It will be appreciated that the control unit 14 may be used in conjunction with other disabling devices, instead of, or in addition to valve 10, such as an ignition cut-out device.

Furthermore, the system described above with reference to the drawings may be associated with other security devices or facilities.

Thus, for example, where the vehicle is an enclosed goods vehicle, the door or doors to the goods compartment thereof may be provided with solenoid operated bolts which are only withdrawn to allow the door or doors to be opened, when the control unit 14 is appropriately set, with a view to circumventing, or at least making more difficult, the kind of crime in which the cargo of a goods vehicle, rather than the vehicle itself, forms the object of the vehicle theft.

The system disclosed may likewise be equipped with a hand or foot operated switch which, when operated, places the vehicle immobilising device or devices in their vehicle immobilising condition, ensures that solenoid-operated door-bolts such as mentioned above are in their operative positions, and may also operate an appropriate alarm device, the system, when such switch is operated, being only re-settable by a security key not carried by the vehicle driver, but for example, kept at the premises of the haulage company operating the vehicle.

A similar facility may also be associated with a door-operated switch, or with trembler or proximity switches such as known per se in vehicle alarm systems, whereby, after operation of the door-operated, or trembler or proximity switch, unavoidable even by the legitimate user of the vehicle in gaining access thereto, the legitimate user has a predetermined short period in which to set the unit 14 to the appropriate setting, or possibly to operate some other device, for example by means of a further key, or a combination lock, before the vehicle becomes irretrievably (without the security key) immobilised, and, preferably an alarm device is simultaneously triggered. Such a facility could be arranged to be set, (in manner known per se), automatically after the elapse of a predetermined period after switching off the vehicle engine, to allow the driver time to secure the vehicle normally before leaving the vehicle.

The anti-theft arrangement of the present invention preferably also has integrated therewith systems for protection against theft of vulnerable accessories, such as the battery, particularly in the case of a lorry or tractor, where the battery is commonly externally mounted.

The arrangement may also have provision to prevent the vehicle from becoming irretrievably immobilised in the event of an accidental failure of the vehicle supply of electrical current, for example due to a fuse blowing, or to generator failure, as opposed to a failure induced by deliberate attempts by a thief to circumvent the system.

It will be appreciated that the arrangement described is applicable equally to private cars, whether petrol or diesel engined, and to goods vehicles such as lorries and the like.

We claim:

1. An anti-theft arrangement for a motor vehicle comprising an electrically operable engine disabling device associated with a system or component essential to operation of the engine of the vehicle and which in a first state permits normal operation of the associated system or component and which in a second state does not;

means for connecting a supply of electrical current to said device, said supply being controlled by combination switching means and in which the arrangement is such that said electrically operable engine disabling device is automatically placed in its state preventing normal operation of the engine upon disconnection of the device from said supply of electrical current; and said combination switching means comprising a plurality of multi-position rotary switches series connected, each having a respective manually operable outer operating knob, for each said switch, scale means and marker index means for each said knob whereby the rotary position of each said knob can be identified.

2. An anti-theft arrangement according to claim 1 wherein said device comprises a cut-off valve connected in a conduit leading from a fuel tank to the engine.

3. An anti-theft arrangement according to claim 2 wherein the vehicle is a diesel engine and said valve is located between the lift pump and the injection pump.

4. An anti-theft arrangement according to claim 1, wherein said electrically operable actuating device, and the switching means controlling the same, are housed within metal casings, the electrical supply terminals of the actuating device being insulated from the casing whereby the switching means cannot be circumvented by making electrical connections to the metal casing.

5. An anti-theft arrangement according to claim 1 including adjustment means whereby the switching means can be adjusted.

6. An anti-theft arrangement according to claim 1, wherein said multi-position rotary switches are housed within a casing having a removable lid, said rotary switches being carried by the lid and each said rotary switch having a body disposed on the inner side of the lid;

a first operating spindle projecting from the casing through a respective aperture in the lid and carrying said outer operating knob, a second operating spindle projecting inwardly into the casing away from the lid carrying an inner operating knob, each said rotary switch being arranged to provide an electrically conductive path therethrough only when the outer operating knob thereof is rotated to a particular position determined by the rotational position of the respective inner operating knob, scale means and marker index means for each said inner knob, whereby the rotary position of each said inner knob can be identified whereby, after opening said lid, a combination can be set, or the combination changed, by turning the inner knobs to desired positions; and locking means being provided for locking said lid against opening.

7. An anti-theft arrangement for a motor vehicle comprising an electrically operable engine disabling device associated with a system or component essential to operation of the engine of the vehicle and which in a first state permits normal operation of the associated system or component and which in a second state does not;

means for connecting supply of electrical current to said device, said supply being controlled by combination or key-operated switching means and in which the arrangement is such that said electrically operable engine disabling device is automatically placed in its state preventing normal operation of the engine upon disconnection of the device from said supply of electrical current;

said switching means being housed within a casing having a removable lid;

locking means being provided for locking said lid against opening, said locking means including abutment means within said casing and detent means within said casing movable between a locking position engaging said abutment means to prevent opening of said lid, and an unlocking position in which it is disengaged from said abutment means to allow the lid to be opened; and including frangible conductor means connected in circuit with said switching means, means mounting said frangible conductor means on one of said lid and said casing in such relating to a member carried by the other of said lid and said casing, that said frangible conductor means is likely to be broken, to disable said electrically operable device, if the lid is forced open with said detent means in said locked position.

8. An anti-theft arrangement according to claim 7 wherein said abutment means is provided adjacent the free end of a latch bar extending within the casing from said lid, said detent is movable within said casing, laterally with respect to said latch bar between its locked and unlocked positions, and said frangible conductor means comprises a fine conductor wire supported by a yoke carried by said detent, the conductor wire being extended across said yoke transversely to both said latch bar and the direction of movement of said detent.

* * * * *